US011593830B2

(12) United States Patent
Sahoo et al.

(10) Patent No.: US 11,593,830 B2
(45) Date of Patent: Feb. 28, 2023

(54) LOYALTY COIN MINER FOR CUSTOMIZED BLOCKCHAIN BASED CUSTOMER LOYALTY PROGRAM

(71) Applicant: Dell Products L.P., Round Rock, TX (US)

(72) Inventors: Sumant Sahoo, Bangalore (IN); Prakash Sridharan, Bangalore (IN); Ramakanth Kanagovi, Bangalore (IN); Ravi Shukla, Bangalore (IN); Arun Swamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 16/599,464

(22) Filed: Oct. 11, 2019

(65) Prior Publication Data

US 2021/0110423 A1 Apr. 15, 2021

(51) Int. Cl.
*G06Q 30/02* (2012.01)
*G06Q 30/0226* (2023.01)
*G06F 16/23* (2019.01)
*G06Q 30/0207* (2023.01)

(52) U.S. Cl.
CPC ..... *G06Q 30/0227* (2013.01); *G06F 16/2315* (2019.01); *G06Q 30/0224* (2013.01)

(58) Field of Classification Search
CPC .... G06Q 30/02; G06Q 40/04; H04L 2209/38; H04L 2209/56
See application file for complete search history.

(56) References Cited

U.S. PATENT DOCUMENTS

| | | | | |
|---|---|---|---|---|
| 2006/0253321 | A1* | 11/2006 | Heywood | G06Q 30/0224 705/14.18 |
| 2008/0082418 | A1* | 4/2008 | Fordyce | G06Q 30/0207 705/14.34 |
| 2013/0304558 | A1* | 11/2013 | Lange | G06Q 30/0239 705/14.27 |
| 2016/0012424 | A1* | 1/2016 | Simon | G06Q 30/0226 705/67 |
| 2017/0140408 | A1* | 5/2017 | Wuehler | G06Q 30/0207 |

(Continued)

FOREIGN PATENT DOCUMENTS

WO WO-2019213530 A1 * 11/2019 ......... G06F 16/2365

OTHER PUBLICATIONS

Raheel Zubairy, IBM Developer, Create a Customer Loyalty Program with Blockchain, May 25, 2018 https://developer.ibm.com/patterns/customer-loyalty-program-with-blockchain/.

(Continued)

*Primary Examiner* — Vincent M Cao
(74) *Attorney, Agent, or Firm* — Terrile, Cannatti & Chambers, LLP; Emmanuel A. Rivera

(57) ABSTRACT

A system, method, and computer-readable medium are disclosed for management of a distributed ledger technology customer loyalty program, by establishing a distributed ledger technology network of customer and entity nodes. The entity nodes support products and/or services purchased by customers, providing a distributed ledger technology platform accessible by the nodes. Transactions between nodes go through the distributed ledger technology platform. A distributed ledger technology ledger which tracks the transactions. Coins/credits are provided to customers based on their transactions.

20 Claims, 6 Drawing Sheets

(56) References Cited

U.S. PATENT DOCUMENTS

| | | | | |
|---|---|---|---|---|
| 2017/0300978 A1* | 10/2017 | Narasimhan | ........ | G06Q 20/3829 |
| 2018/0247320 A1* | 8/2018 | Gauld | ................ | G06Q 30/0233 |
| 2019/0073666 A1* | 3/2019 | Ortiz | .................... | H04L 9/3236 |
| 2019/0180311 A1* | 6/2019 | Chan | .................. | G06Q 30/0236 |
| 2019/0197574 A1* | 6/2019 | Berman | ............. | G06Q 20/3224 |
| 2019/0311392 A1* | 10/2019 | Swamidurai | ....... | G06Q 30/0227 |
| 2019/0355005 A1* | 11/2019 | Kappagantu | .......... | H04L 9/3239 |
| 2019/0370847 A1* | 12/2019 | Khan | ................. | G06Q 30/0233 |

OTHER PUBLICATIONS

Aaron Wiseman, Sendy, Why Customer Loyalty Programs are Ripe for Blockchain Disruption, Jul. 15, 2018 https://medium.com/sendy-token/why-customer-loyalty-programs-are-ripe-for-blockchain-disruption-ae4befe8d450.

* cited by examiner

LOYALTY COIN MINER FOR CUSTOMIZED BLOCKCHAIN BASED CUSTOMER LOYALTY PROGRAM

BACKGROUND OF THE INVENTION

Field of the Invention

The present invention relates to the management of information handling systems. More specifically, embodiments of the invention provide a system, method, and computer-readable medium for improved management of a distributed ledger technology or blockchain based customer loyalty program.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Customer loyalty programs can be used by businesses to retain customers. It may be five times more costly to attract than retain customers. It is less costly for a business to retain customers than to attract new customers. Loyal customers can promote the business and the business' brand and can also lead to introducing and attracting new customers to the business.

A customer loyalty program implemented by a business can help the business build a loyal customer base, retain customers, and achieve sustainable growth for the business. In addition to increasing sales, a well-structured customer loyalty program can create a channel in which the business can offer rewards and great customer experiences. Furthermore, customers can provide valuable data and insights to regarding the business. Such data and insights can include customer behavior, buying patterns, average spending, etc. Ideally, a business looks to the needs of customers and what can server them better. As part of a broader business plan, a customer loyalty program can focus on customer needs and issues affecting customers, rather than forcing unwanted products and/or services upon customers.

SUMMARY OF THE INVENTION

A system, method, and computer-readable medium are disclosed for management of a distributed ledger technology customer loyalty program, by establishing a distributed ledger technology network of customer and entity nodes. The entity nodes support products and/or services purchased by customers, providing a distributed ledger technology platform accessible by the nodes. Transactions between nodes go through the distributed ledger technology platform. A distributed ledger technology ledger which tracks the transactions. Coins/credits are provided to customers based on their transactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for management of a distributed ledge technology or blockchain based customer loyalty program. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
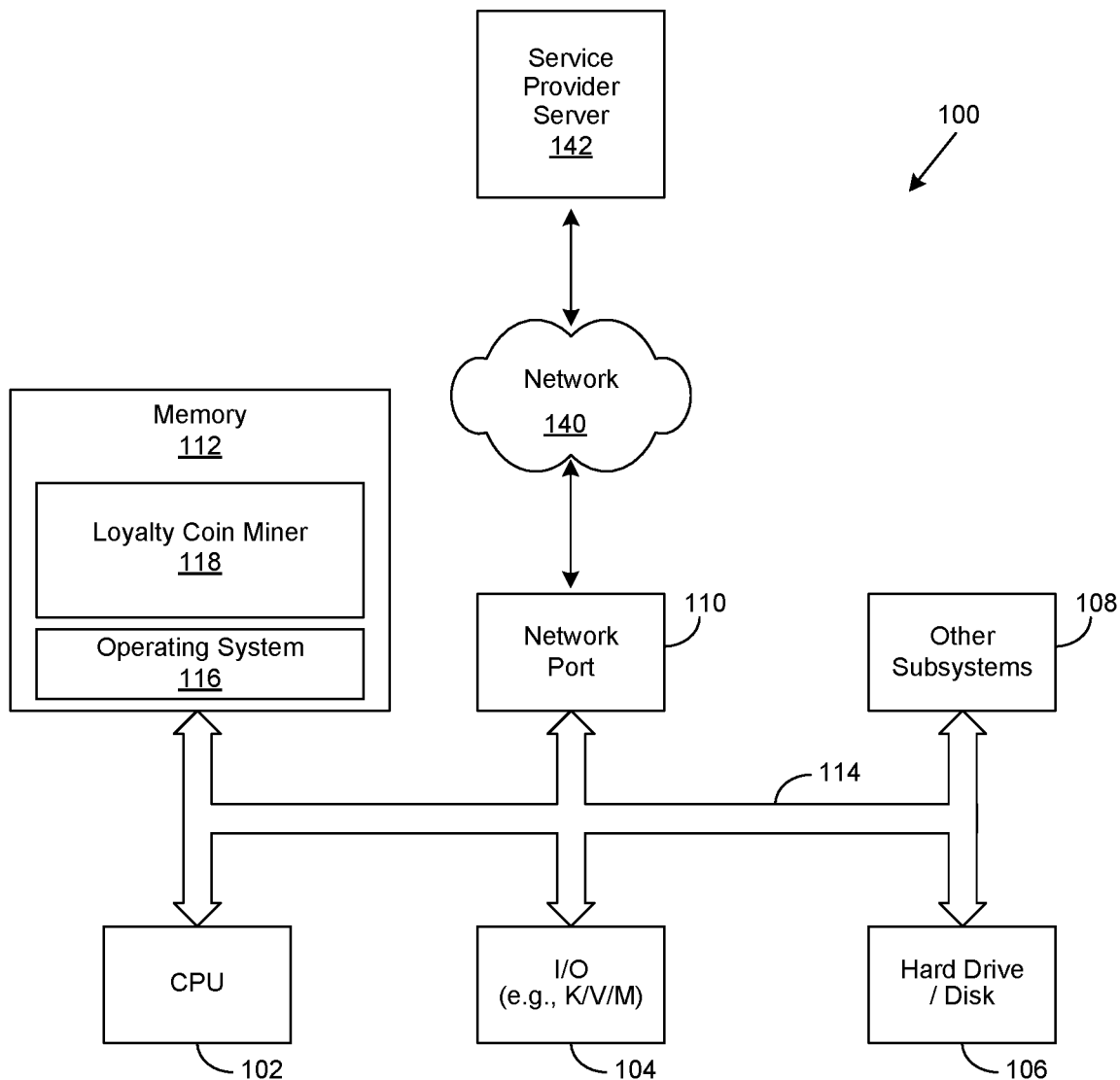
FIG. 1 is a general illustration of components of an information handling system.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a loyalty coin miner 118.

In general, the loyalty coin miner 118 provides for implementation of algorithms as to customer transactions (i.e., authenticating customer transactions); determining loyalty coins for customers based on factors, such as loyalty factors; managing rules as to a customer loyalty program; and supporting the business, business units, etc. in managing, evolving and supporting the customer loyalty. In certain implementations, the loyalty coin miner 118 is provided as a service from the service provider server 142.

Figure 2:
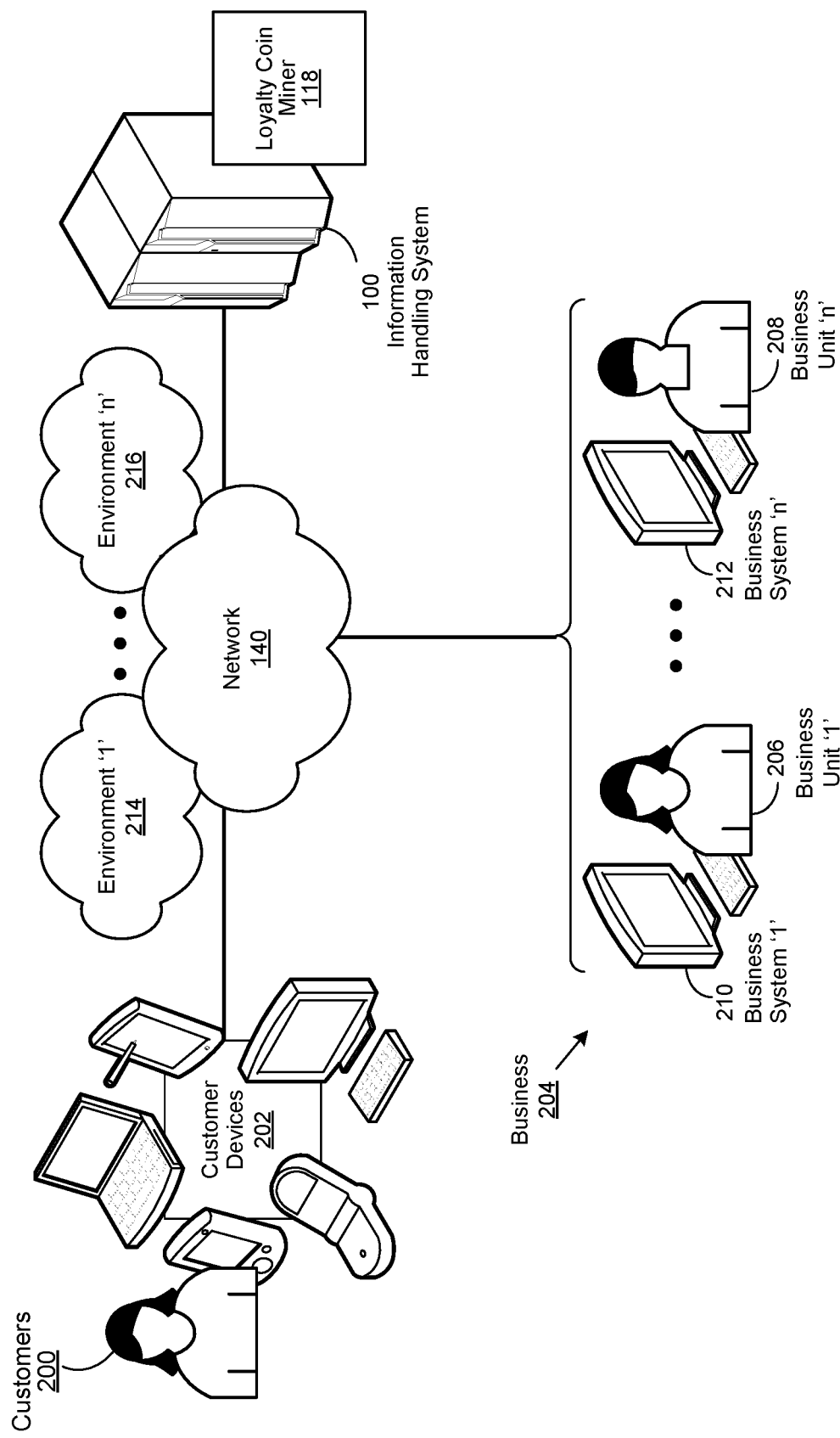
FIG. 2 is a simplified block diagram of a blockchain based customer loyalty program system.

FIG. 2 is a simplified block diagram of the loyalty coin miner 118 implemented in accordance with an embodiment of the invention to provide for management of software applications. In various embodiments, customers, as represented by customers 200 through customer devices 202 purchase products and/or services from a business entity or business 204. Business 204 can include various business units, represented by business unit '1' 206 to business unit 'n' 208. For certain implementations, business system '1' 210 to business system 'n' 212 respectively support business unit '1' 206 to business unit 'n' 208.

As used herein, customer devices 202 refers to an information handling system such as a personal computer, a laptop computer, a tablet computer, a personal digital assistant (PDA), a smart phone, a mobile telephone, or other device that is capable of communicating and processing data. In certain implementations, customer devices 202 are representative of a customer environment that includes various computing devices (e.g., servers), storage, software solutions, hardware (e.g., accessories), etc. In certain implementations, the business system '1' 210 to business system 'n' 212 are representative of a business environment that includes various computing devices (e.g., servers), storage, software solutions, hardware (e.g., accessories), etc.

The customer devices 202, and the business system '1' 210 to business system 'n' 212 can be to the network 140. Furthermore, customer devices 202, and the business system '1' 210 to business system 'n' 212 can be another and the information handling system 100 through the network 140. In certain embodiments, the network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

Furthermore, network 140 can include environment '1' 214 through environment 'n' 216. Environment '1' 214 through environment 'n' 216 can include various marketplaces, sites, platforms, environments, etc., that provide products and/or services to customers 200. Environment '1' 214 through environment 'n' 216 can be operated by the business 204, and business unit '1' 206 to business unit 'n' 208. In certain implementations, the environment '1' 214 through environment 'n' 216 can be operated by third party vendors, strategic partners, product/service distributors, etc.

In certain implementations, the business unit '1' 206 to business unit 'n' 208 can include product support or customer support units, such as information technology (IT) administrators, that assist customers 200. For example, a product support unit can provide software application updates, documentations, links for help, etc. to customers 200. Business unit 1" 208 through business unit 'n' 210 can include marketing, product development, sales, etc. which have interests in customers 200 use and satisfaction of products and/or services provided by the business 204. For example, a marketing unit can look into data and insights of customers 200 that can generate or grow the business 204 and understand and correct for issues affecting customers 200 and give recommendations as to how the business 204 can provide better products and/or services.

Figure 3:
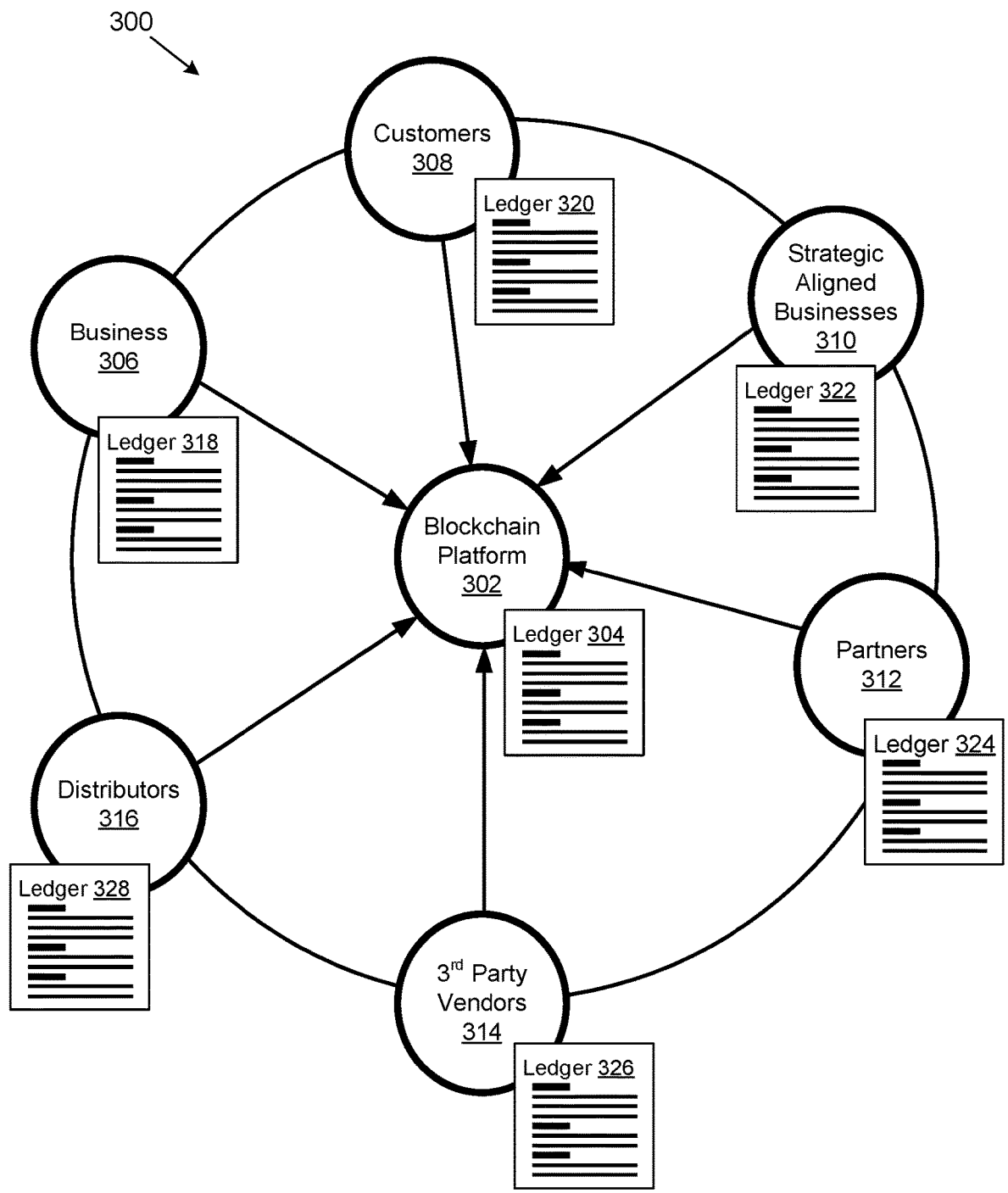
FIG. 3 is a simplified block diagram of a blockchain network.

FIG. 3 shows a block diagram of blockchain network. The blockchain network 300 represents a distributed ledger technology. In this example and throughout the description, a blockchain is described; however, it is to be understood that other distributed ledger technologies can be implemented.

In this example, a blockchain platform 302 maintains a decentralized ledger 304. The decentralized ledger 304 can be implemented as a blockchain and is shared across the blockchain network 300. In particular, the decentralized ledger 304 is sent to various nodes, such as business node 306, customers node 308, strategic aligned business or SAB node 310, partners node 312, third party nodes 314, and distributors node 316. Other nodes can be implemented. Furthermore, the nodes 306 to 316 can have sub-nodes. For example, there can be various sub-nodes of customers that are represented by customers node 308.

The decentralized ledger 304 is distributed to business node 306, customers node 308, SAB node 310, partners node 312, third party nodes 314, and distributors node 316, and copies of the decentralized ledger 304 as represented by ledger 318, ledger 320, ledger 322, ledger 324, ledger 326, ledger 328 are held at the respective nodes. No one node (i.e., entity) can change, modify, or present as valid the decentralized 304 if the contents are different from the copies of the ledger 304 that are held at the blockchain platform 302 and the other nodes. Changes, including transactions between node 306 to node 316, can be recorded in the decentralized ledger 304. Since the decentralized ledger 304 is shared between multiple entities as represented by node 306 to node 316, the same data is shared in one location, particularly the decentralized ledger 304.

The blockchain network 300 further can provide for a token-based identification of entity (e.g., customer, partner, service center, etc.) actions to assure data integrity and validation. In addition, through visibility of customer actions, loyalty/product offerings can be tailored for specific customers based on their behaviors as stored in the decentralized ledger 304. For certain implementations, the blockchain or decentralized ledger 304 is semi-private where certain customer sensitive can be stored in secure systems for entities (i.e., nodes) in the blockchain network to is made available for transactions. Actions performed with the blockchain or decentralized ledger 304 offer transparency and security which can prevent misuse.

The blockchain network 300 selectively provides for entities (i.e., nodes) that support a business' products and/or services. Therefore, customers (i.e., customers node 308) deal only with the entities (i.e., the other nodes of blockchain network 300) that support the business' products and/or services when using the blockchain network 300 and are encouraged to deal with or use business approved parts and/or services related to product and/or services. The customer loyalty program as implemented by the blockchain network 300 can encourage customer engagement and increase opportunities for the business. For example, customers (i.e., customers node 308) purchase products and/or services through various touchpoints or entities (i.e., the other nodes) of blockchain network 300 and are rewarded through the customer loyalty program. Customer actions are monitored, and transactions on the blockchain network 300 are "broadcast" to the nodes, where each node keeps the copies of the same blockchain. In certain implementations, coins or credit credited to customers can be used and/or exchanged on the blockchain network 300.

Figure 4:
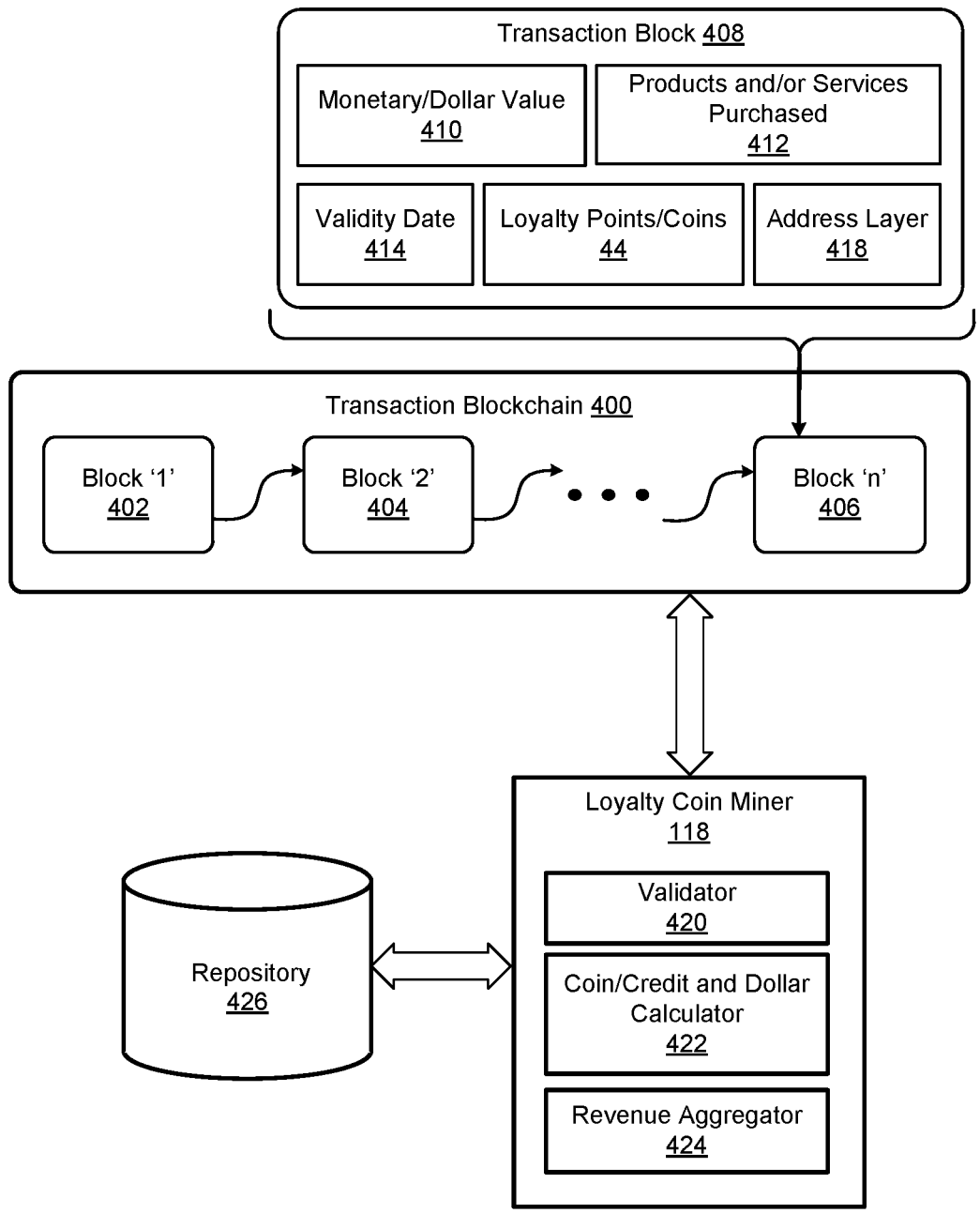
FIG. 4 is a simplified block diagram of a loyalty coin mine interacting with a transaction blockchain.

FIG. 4 shows a block diagram of a loyalty coin miner and interaction with a transaction block chain. A transaction blockchain 400 represents the ledger 304 that is described in FIG. 3. The transaction blockchain 400 is made of succeeding blocks, as represented by block '1' 402, block '2' 404 to block 'n' 406. The transaction blockchain 400 can be modified by appending or adding additional blocks. As discussed, as the block 400 is modified, all the entities of the blockchain network receive copies of the modified blockchain 400.

Transaction block 408 is an example of a block in blockchain 400. In certain implementations, the transaction block 408 includes data and information that describes a transaction performed by a customer. In certain implementations, the data and information in block 408 can include a monetary/dollar value of the transaction 410, the products and/or services that were purchased 412, a validity or purchase date 414, a number of loyalty coins/credits that are credited for the transaction 416, and an address layer 418 that sis specific to a customer. In certain implementations, the coins/credits that are credited to the customer can be used or exchanged by the customer within the blockchain network 300.

In example transaction, a customer buys a product Y, worth $200, on April 2020 from the business. The transaction is broadcasted to the nodes of the blockchain network, the nodes validate the transaction, and a new block is created for the blockchain 400. The new block can include the information as to the product or an accumulation of products/services as purchased by the particular customer; the dollar amount or an accumulated amount spent by the particular customer, the date of the transaction; the amount of loyalty coins/credit for the transaction or in total; and an address layer for the particular customer.

In certain embodiments, the loyalty coin miner 118 is configured with a validator 420 that validates customer transactions, a coin/credit and dollar calculator 422 that assigns values for loyalty coins/credits and for dollar values of coins/credits, and a revenue aggregator 424. The functions of validator 420, calculator 422 and revenue aggregator 424 are further described below.

In certain implementations, a repository is 426 is provided that stores a record of blockchains and coins/credit. The repository 426 can also be implemented to store additional information or data, such as customer historical purchases, customer loyalty factors, rules as to determining loyalty factors, etc. which can be used by the loyalty coin miner 118.

In certain implementations, the loyalty coin miner 118 is activated when a customer transaction takes place. The validator 420 can be implemented to validate such transactions. The following algorithm is an example of a how loyalty coins/credits can be allocated to customers based on their transactions. In certain implementations the calculator 422 can be implemented to perform such actions.

For example, for every $10 purchase of a business' product and/or services, the customer gets one coin/credit. The coin/credit to dollar purchase ratio can differ base on a customer's historic purchase. More loyal customers can receive greater credits.

As a baseline, to determine coins, credits (the terms coin and credit are interchangeable) the following ratio is used, where N=dollars spent:

Number of coins=$N/10$

For all customers, the loyalty coin miner 118 computes a running four quarters (fiscal year) aggregated revenue attributed to the particular or specific customer that makes the purchase. For certain implementations, the revenue aggregator 242 can perform the calculation. This is invoked every time a customer purchases a product and/or service. This is not just invoked at every customer transaction instance but can also be computed at the end of each financial quarter. At each instance of a transaction date or end of quarter, revenue is summed looking backwards for four quarters or 365 days.

Next, a chain of revenue numbers with a trend is captured. This can be referred to as a "Running 4Q Trend" or R4QT as is defined by the following formula:

$$R4QT = \text{Trend of} \sum_{d=-365}^{0} \text{Revenue per transaction}$$

where d is the days dating till 365 days in the past from the current customer transaction date or from the end of every quarter.

For the first year and from the first transaction for a customer, the R4QT can be computed every 30 days. At every instance of an aggregated revenue value in the R4QT trend, a logarithmic weight can be assigned based on its index in the trend series. The index starts from earliest entry with a value 1 to the latest R4QT entry having an index value equal to the length of the trend series. Indices are considered only if the R4QT revenue number in any two consecutive indices are non-zero values. The R4QT then computes percentage (%) change in revenue between two consecutive valid indices. These percentage (%) changes are then multiplied with "log (10+Index_Number)". A sum of this weighted percentage (%) change in revenue gives the "Loyalty Factor" of the customer. This is represented in the following formula:

Loyalty Factor =

$$\sum_{1}^{n(\text{valid indices})} (\% \text{ change in } R4QT) * \log_{10}(10+n) / \sum \log_{10}(10+n)$$

The historical Loyalty Factor for all customers are stored in the database and only the latest transaction is added to the formula at every new customer purchase instance or end of quarter as the case would be.

To convert coin to dollars the following conversion can be performed. Ion certain implementations the calculator 422 can perform this conversion. Customers can be categorized into three loyalty categories, and their conversion is based on specific formula related to their category. The three loyalty categories are as follows:

$$\begin{cases} \text{Loyalty Factor} < 0 \\ 0 \leq \text{Loyalty Factor} < 0.1 \\ \text{Loyalty Factor} \geq 0.1 \end{cases} \begin{cases} (\text{no of coins}) \times \log_2(1 + \text{Loyalty Factor}) \\ (0.1 + 0.4 \times \text{Loyalty Factor}) \times \text{no of coins} \\ \text{no of coins} \times e^{\text{Loyalty Factor}} / 10 \end{cases}$$

Figure 5A:
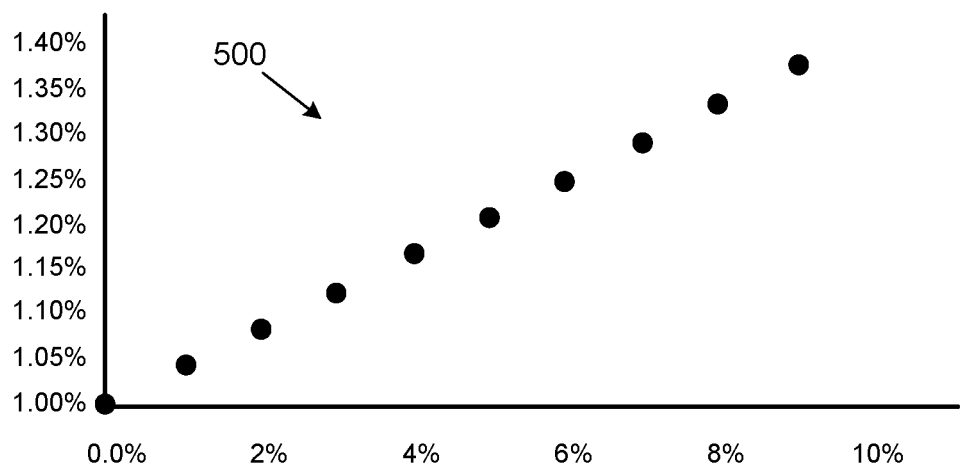
FIG. 5A is a graph that indicates a trend for neutral growth customers.
Figure 5B:
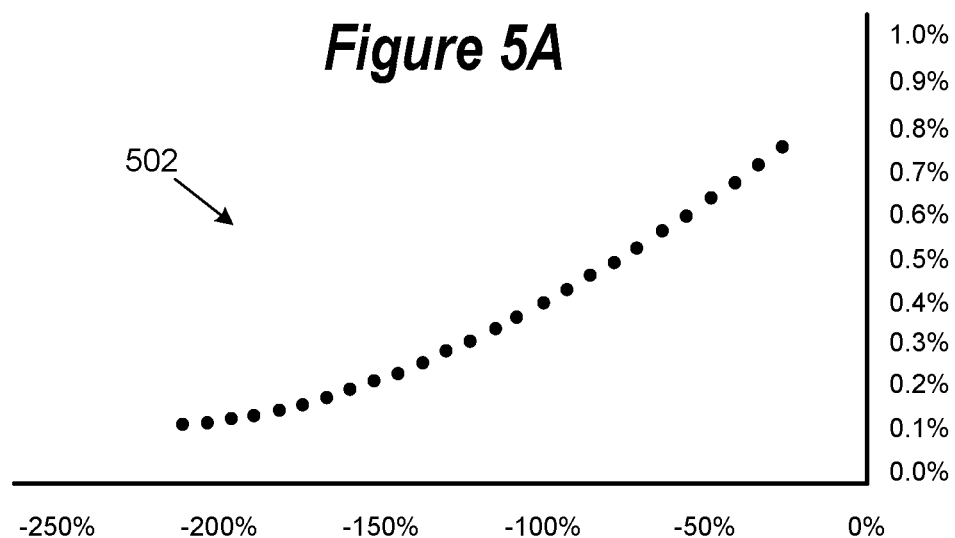
FIG. 5B is a graph that indicates a trend for negative growth customers.
Figure 5C:
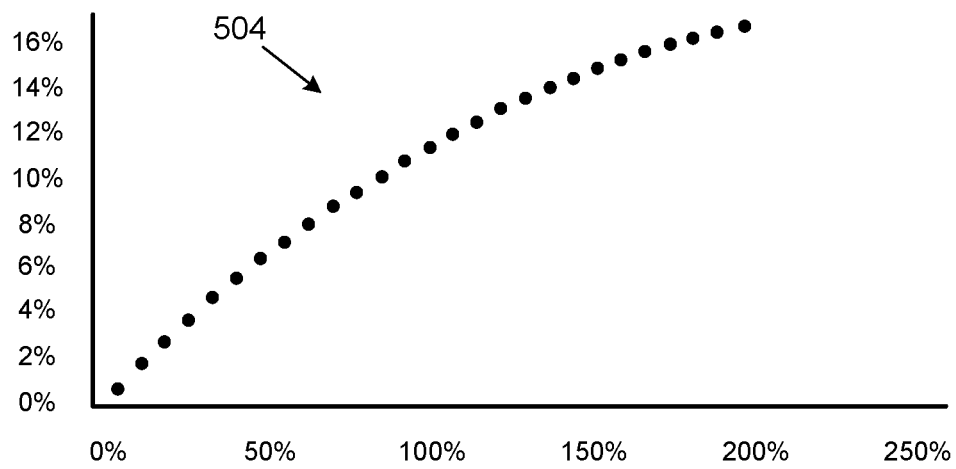
FIG. 5C is a graph that indicates a trend for growth customers.

Loyalty factors are derived by fitting a customer's loyalty factor in one of three graphs, as shown in FIGS. 5A, 5B, and 5C. FIG. 5A shows a graph 500 that describes 0≤Loyalty Factor<1, that depicts "neutral growth customers." FIG. 5B shows a graph 502 that describes Loyalty Factor<0, that depicts "de-growing or negative growth customers." FIG. 5C shows a graph 504 that describes Loyalty Factor≥0.1, that depicts "growing or positive growth customers."

Referring back to FIG. 4, example rules implemented by the loyalty coin miner 118 can be the following. For the first four quarters, a customer's credited revenue is aggregated for the latest 60 days for every customer transaction and also at end of every month. It is assumed the transactions are made/credited at end of the month for simplicity purposes.

Baseline of one coin for every 10 (ten) dollars spent. A monthly valid index, which is a sequential number starting from a two-month period (R2MT) or latest 60 days revenue aggregation is determined. A percentage (%) change in is calculated as the rate of change of aggregated revenue in the two-month period (R2M) and R4QT between the current transaction and a previous transaction. If the current transaction and the previous transaction are both zero, then percentage (%) in revenue value is considered to be 0%. If the current transaction is zero while the previous transaction is non-zero, then percentage (%) change in revenue is considered to be −100%. If the current transaction is non-zero while the previous transaction is zero, then percentage (%) change in revenue is considered to be 100%.

A Log 10(Index) is computed. The loyalty factor is computed at every revenue transaction. The formula can be weighted average of percentage (%) change in revenue where weights are Log 10(Index).

For $5^{th}$ quarter and onwards (i.e., after the four quarters), revenue is aggregated for the latest year at every transaction instance and also at end of every quarter. It is assumed the transactions are made/credited at end of the month for simplicity purposes.

Baseline of one coin for every 10 (ten) dollars spent. A quarterly valid index which is a sequential number starting from the second transaction of R4QT (i.e., latest year revenue aggregation) is determined. A percentage (%) change in is calculated as the rate of change of aggregated revenue in the two-month period (R2M) and R4QT between the current transaction and a previous transaction. If the current transaction and the previous transaction are both zero, then percentage (%) in revenue value is considered to be 0%. If the current transaction is zero while the previous transaction is non-zero then percentage (%) change in revenue is considered to be −100%. If the current transaction is non-zero while the previous transaction is zero, then percentage (%) change in revenue is considered to be 100%.

A Log 10(Index) is computed. The loyalty factor is computed at every revenue transaction. The formula can be weighted average of percentage (%) change in revenue where weights are Log 10(Index). An exception can be made for the first transaction of the first two-month period (R2MT) or the latest year aggregation (R4QT), where the loyalty factor is given a default value of 0.05.

Figure 6:
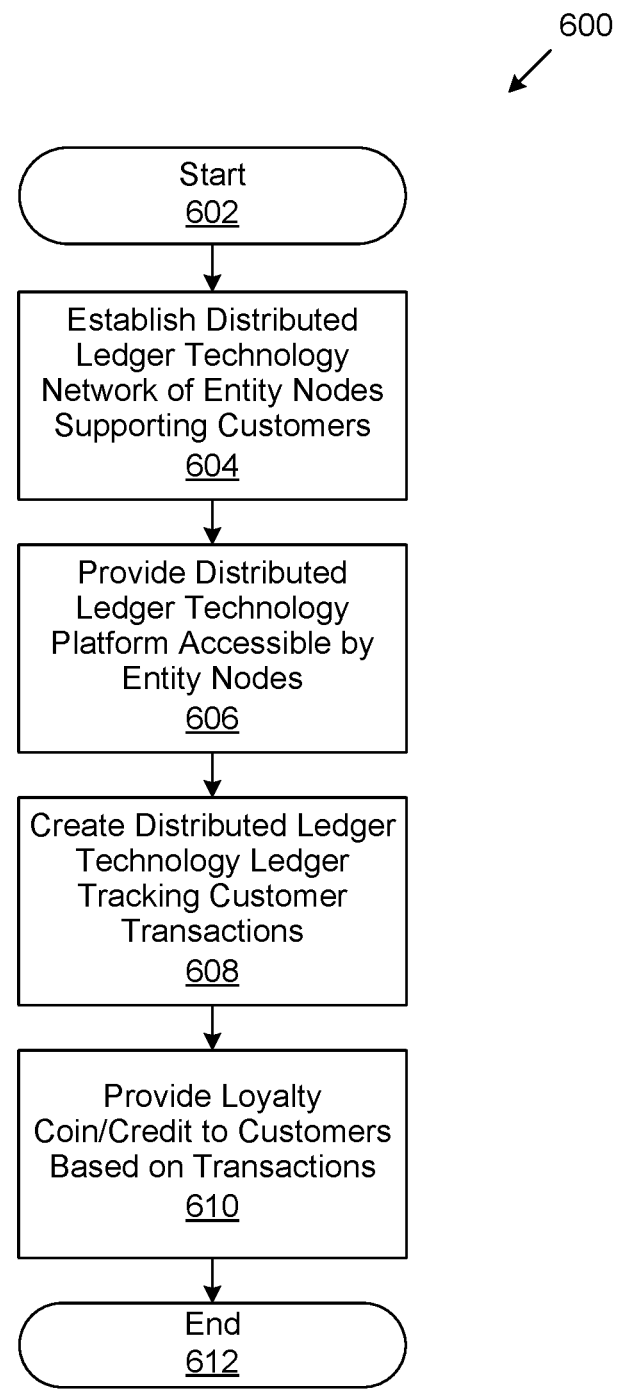
FIG. 6 is a general flowchart for management of a distributed ledger technology or blockchain based customer loyalty program.

FIG. 6 is a generalized flowchart 600 for management of a distributed ledger technology or blockchain based customer loyalty program. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602 the process 600 starts. At step 604, a distributed ledger technology network, such as a blockchain network, is established. The network includes customer nodes and multiple entity nodes that support products and/or services that a business provides to the customers (i.e., customer nodes). At step 606, a distributed ledger technology platform is provided. The distributed ledger technology platform is accessible by all the nodes on the distributed ledger technology network. Transactions between the nodes go through the distributed ledger technology platform. At step 608, a distributed ledger technology ledger is created. The ledger keeps track of customer transactions and can include coins and credit for customers. At block 610, based on customers transactions, coins and credits are provided to customers. At block 612, the process 600 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for management of a distributed ledger technology customer loyalty program comprising:
   supporting products and/or services purchased by customers by entity nodes of a distributed ledger technology network of customer and entity nodes;
   accessing a distributed ledger technology platform accessible by the entity nodes, wherein customer transactions between entity nodes are received by the distributed ledger technology platform and are managed by a loyalty coin miner implementing algorithms that include authenticating and validating customer transactions;
   determining loyalty coins for customers based on loyalty factors, wherein loyalty factors are determined by customer transactions attributed to a customer over a particular fiscal period, wherein an algorithm determines the loyalty coins based on the number of dollars spent by a customer based on a running four quarters (R4QT) of the fiscal period computed at the end of each quarter, wherein (R4QT) is defined by $$R4QT = \text{Trend of} \sum_{d=-365}^{0} \text{Revenue per transaction}$$

wherein d is the days dating till 365 days in the past from the current customer transaction date or from the end of every quarter;
   managing rules as to a customer loyalty program;
   categorizing a customer into three loyalty categories;
   supporting the business and business units in managing, evolving and supporting customer loyalty, wherein the algorithms consider purchases of customers over a given period and loyalty category; and
   tracking through a distributed ledger the transactions and providing coins/credits to the customers based on their transactions.

2. The method of claim 1, wherein the distributed ledger technology is a blockchain.

3. The method of claim 1, wherein the entity nodes include one or more of the following: business node, strategic aligned business (SAB) node, partners node, third party node, and distributor node.

4. The method of claim 1, wherein the transactions include one or more of the following data: monetary value of a transaction, products and/or services that were purchased during the transaction, purchase date of the products and/or services, a number of loyalty coins/credits credited for the transaction, and an address of a customer of the transaction.

5. The method of claim 1, wherein the providing coins/credits accounts for a loyalty factor.

6. The method of claim 5, wherein the loyalty factor takes into account previous purchases by a customer.

7. The method of claim 5, wherein the loyalty factor takes into account purchasing trends of a customer.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for improved management of a distributed ledger technology customer loyalty program executable by the processor and configured for:
      a distributed ledger technology network of customer and entity nodes, wherein the entity nodes support products and/or services purchased by customers;
      a distributed ledger technology platform accessible by the nodes, wherein customer transactions between nodes are received by the distributed ledger technology platform and are managed by a loyalty coin miner implementing algorithms that include authenticating and validating customer transactions, determining loyalty coins for customers based on loyalty factors, wherein loyalty factors are determined by customer transactions attributed to a customer over a particular fiscal period, wherein an algorithm determines the loyalty coins based on the number of dollars spent by a customer based on a running four quarters (R4QT) of the fiscal period computed at the end of each quarter, wherein (R4QT) is defined by $$R4QT = \text{Trend of} \sum_{d=-365}^{0} \text{Revenue per transaction}$$

managing rules as to a customer loyalty program and categorizing a customer into three loyalty categories; and supporting the business and business units in managing, evolving and supporting customer loyalty, wherein the algorithms consider purchases of customers over a given period and loyalty category; and a distributed ledger which tracks the transactions and provides coins/credits to the customers based on their transactions.

9. The system of claim 8, wherein the wherein the distributed ledger technology is a blockchain.

10. The system of claim 8, wherein the entity nodes include one or more of the following: business node, strategic aligned business (SAB) node, partners node, third party node, and distributor node.

11. The system of claim 8, wherein the transactions include one or more of the following data: monetary value of a transaction, products and/or services that were purchased during the transaction, purchase date of the products and/or services, a number of loyalty coins/credits credited for the transaction, and an address of a customer of the transaction.

12. The system of claim 8, wherein the providing coins/credits accounts for a loyalty factor.

13. The system of claim 12, wherein the loyalty factor takes into account previous purchases by a customer.

14. The system of claim 12, wherein the loyalty factor takes into account purchasing trends of a customer.

15. A non-transitory, computer-readable storage medium embodying computer program code, the computer program code comprising computer executable instructions configured for:

a distributed ledger technology network of customer and entity nodes, wherein the entity nodes support products and/or services purchased by customers;

a distributed ledger technology platform accessible by the nodes, wherein customer transactions between nodes are received by the distributed ledger technology platform and are managed by a loyalty coin miner implementing algorithms that include authenticating and validating customer transactions, determining loyalty coins for customers based on loyalty factors, wherein loyalty factors are determined by customer transactions attributed to a customer over a particular fiscal period, wherein an algorithm determines the loyalty coins based on the number of dollars spent by a customer based on a running four quarters (R4QT) of the fiscal period computed at the end of each quarter, wherein (R4QT) is defined by $$R4QT = \text{Trend of} \sum_{d=-365}^{0} \text{Revenue per transaction}$$

managing rules as to a customer loyalty program and categorizing a customer into three loyalty categories; and supporting the business and business units in managing, evolving and supporting customer loyalty, wherein the algorithms consider purchases of customers over a given period and loyalty category; and a distributed ledger which tracks the transactions and provides coins/credits to the customers based on their transactions.

16. The non-transitory, computer-readable storage medium of claim 15, wherein the entity nodes include one or more of the following: business node, strategic aligned business (SAB) node, partners node, third party node, and distributor node.

17. The non-transitory, computer-readable storage medium of claim 15, wherein the transactions include one or more of the following data: monetary value of a transaction, products and/or services that were purchased during the transaction, purchase date of the products and/or services, a number of loyalty coins/credits credited for the transaction, and an address of a customer of the transaction.

18. The non-transitory, computer-readable storage medium of claim 15 wherein the providing coins/credits accounts for a loyalty factor.

19. The non-transitory, computer-readable storage medium of claim 18, wherein the loyalty factor takes into account previous purchases by a customer.

20. The non-transitory, computer-readable storage medium of claim 18, wherein the loyalty factor takes into account purchasing trends of a customer.

\* \* \* \* \*